United States Patent
Millard (10) Patent No.: US 11,457,581 B1
(45) Date of Patent: Oct. 4, 2022

(54) HYDROPONIC GROWING SYSTEM

(71) Applicant: Di Marco Millard, Ft Washington, MD (US)

(72) Inventor: Di Marco Millard, Ft Washington, MD (US)

( * ) Notice: Subject to any disclaimer, the term of this patent is extended or adjusted under 35 U.S.C. 154(b) by 127 days.

(21) Appl. No.: 17/121,946

(22) Filed: Dec. 15, 2020

(51) Int. Cl.
*A01G 31/06* (2006.01)
*A01G 9/24* (2006.01)
*A01G 27/00* (2006.01)

(52) U.S. Cl.
CPC .............. *A01G 31/06* (2013.01); *A01G 9/249* (2019.05); *A01G 27/003* (2013.01)

(58) Field of Classification Search
CPC .............. A01G 31/02; A01G 2031/006; A01G 27/003; A01G 31/06
See application file for complete search history.

(56) References Cited

U.S. PATENT DOCUMENTS

| D606,773 | S | 12/2009 | Copp |
| 10,076,090 | B2 | 9/2018 | Joseph |
| 10,383,292 | B2 | 8/2019 | Jollie |
| 10,390,494 | B2 | 8/2019 | Harms |
| 10,524,433 | B2 | 1/2020 | Spiro |
| 10,624,322 | B2 | 4/2020 | Vandenborre |
| 2002/0088177 | A1* | 7/2002 | Gergek ................ A01G 27/003 47/79 |
| 2008/0246282 | A1 | 10/2008 | Hathaway |
| 2018/0332830 | A1* | 11/2018 | Gordon ................ B01D 61/025 |
| 2019/0029196 | A1* | 1/2019 | Leach .................... A01G 22/00 |
| 2019/0082618 | A1 | 3/2019 | Lopez |
| 2019/0259108 | A1* | 8/2019 | Bongartz .............. A01G 31/02 |
| 2020/0029508 | A1 | 1/2020 | Losada |
| 2020/0084983 | A1 | 3/2020 | Liang |

FOREIGN PATENT DOCUMENTS

| CN | 105706886 A * | 6/2016 | |
| WO | WO-2011049084 A1 * | 4/2011 | ............. A01G 31/06 |

* cited by examiner

Primary Examiner — Monica L Barlow
(74) Attorney, Agent, or Firm — Kyle A. Fletcher, Esq.

(57) ABSTRACT

The hydroponic growing system, comprising a support frame, a cover, one or more grow lights, a plurality of growing barrels, a water tank, a first water pump, an air pump, a sprinkler subsystem, a hydroelectric generating subsystem, and a system controller, may be a growing system for growing one or more plants. The one or more plants may be grown within the plurality of growing barrels supported within the support frame. The one or more grow lights suspended from the cover may provide illumination that is necessary for photosynthesis. Water may be stored in the water tank may be pumped to the one or more plants by the first water pump. The air pump may oxygenate the water. The hydroelectric generating subsystem may generate electricity as the water moves through the hydroponic growing system.

18 Claims, 5 Drawing Sheets

HYDROPONIC GROWING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of hydroponic cultivating, more specifically, a hydroponic growing system.

SUMMARY OF INVENTION

The hydroponic growing system, comprising a support frame, a cover, one or more grow lights, a plurality of growing barrels, a water tank, a first water pump, an air pump, a sprinkler subsystem, a hydroelectric generating subsystem, and a system controller, may be a growing system for growing one or more plants. The one or more plants may be grown within the plurality of growing barrels supported within the support frame. The one or more grow lights suspended from the cover may provide illumination that is necessary for photosynthesis. Water may be stored in the water tank may be pumped to the one or more plants by the first water pump. The air pump may oxygenate the water. The hydroelectric generating subsystem may generate electricity as the water moves through the hydroponic growing system. The hydroponic growing system may support multiple hydroponic techniques. As non-limiting examples, the hydroponic growing system may support growing the one or more plants in substrates, using aeroponic techniques, using deep water culture techniques, and using flood and drain techniques.

An object of the invention is to provide a hydroponic growing system for growing a plurality of plants.

Another object of the invention is to generating electricity from the force of the water pumped through the growing system.

A further object of the invention is to provide a mechanism, for changing the height of the growing system frame, thus changing the distance between the plant and a plurality of growing lights.

Yet another object of the invention is to provide an air pump for aerating the water.

These together with additional objects, features and advantages of the hydroponic growing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the hydroponic growing system in detail, it is to be understood that the hydroponic growing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hydroponic growing system.

It is therefore important that the claims be regarded as including such equivalent construction insofar as they do not depart from the spirit and scope of the hydroponic growing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The hydroponic growing system 100 (hereinafter invention) comprises a support frame 200, a cover 220, one or more grow lights 230, a plurality of growing barrels 232, a water tank 240, a first water pump 250, an air pump 256, a sprinkler subsystem, a hydroelectric generating subsystem, and a system controller 290. The invention 100 may be a growing system for growing one or more plants 910. The one or more plants 910 may be grown within the plurality of growing barrels 232 supported within the support frame 200.

The one or more grow lights 230 suspended from the cover 220 of the support frame 200 may provide illumination that is necessary for photosynthesis. Water 900 may be stored in the water tank 240 and may be pumped to the one or more plants 910 by the first water pump 250. The air pump 256 may oxygenate the water 900. The hydroelectric generating subsystem may generate electricity as the water 900 moves through the invention 100. The invention 100 may support multiple hydroponic techniques. As non-limiting examples, the invention 100 may support growing the one or more plants 910 in substrates, using aeroponic techniques, using deep water culture techniques, and using flood and drain techniques.

The support frame 200 may comprise a plurality of bottom horizontal frame members 202, a bottom panel 204, a plurality of top horizontal frame members 206, and a plurality of vertical supports 208. The support frame 200 may retain the plurality of growing barrels 232 under the one or more grow lights 230 and may collect the water 900 running off of the one or more plants 910. In some embodiments, the footprint of the support frame 200 may be an elongated hexagon.

The plurality of bottom horizontal frame members 202 may be vertically-oriented walls surrounding the support frame 200 at the bottom of the plurality of vertical supports 208. The height of the plurality of bottom horizontal frame members 202 may be less than the height of the plurality of growing barrels 232. The bottom panel 204 may cover the bottom of the support frame 200. The edges of the bottom panel 204 may be coupled to the bottom edge of the plurality of bottom horizontal frame members 202 such that the bottom panel 204 and the plurality of bottom horizontal frame members 202 may form a catch basin 216 operable to retain the water 900 falling from above. The plurality of top horizontal frame members 206 may be vertically-oriented walls surrounding the support frame 200 at the top of the plurality of vertical supports 208. The plurality of top horizontal frame members 206 may retain the shape of the support frame 200 as the plurality of vertical supports 208 are expanded and retracted.

The plurality of vertical supports 208 may be telescoping support members dispersed around the periphery of the invention 100. An individual vertical support 210 may expand and contract such that the height of the support frame 200 may be adjusted. The individual vertical support 210 may comprise a top support section 212 and a bottom support section 214. The top support section 212 may be a vertically-oriented hollow armature. The top of the top support section 212 may be coupled to the inside surface of the plurality of top horizontal frame members 206. The bottom support section 214 may be a vertically-oriented armature. The bottom of the bottom support section 214 may be coupled to the inside surface of the plurality of bottom horizontal frame members 202. The outside diameter of the bottom support section 214 may be smaller than the inside diameter of the top support section 212 such that the bottom support section 214 may slide into the top support section 212. The height of the support frame 200 may be fixed or released using locking mechanisms on the plurality of vertical supports 208.

The cover 220 may cap the top of the support frame 200. The cover 220 may be hingedly coupled to the support frame 200 via one or more hinges 222. The one or more grow lights 230 may be coupled to the underside of the cover 220 such that the one or more grow lights 230 illuminate the one or more plants 910 located within the support frame 200. The one or more grow lights 230 may be selected to provide a spectral output resembling the spectrum of sunlight to promote photosynthesis.

The plurality of growing barrels 232 may be open-top canisters. An individual growing barrel 234 selected from the plurality of growing barrels 232 may retain the water 900 for roots 914 of an individual plant 912. The individual growing barrel 234 may comprise an overflow outlet 238 such that the water level within the individual growing barrel 234 may not rise above the overflow outlet 238.

The individual growing barrel 234 may retain a hydro pot 236 at the top of the individual growing barrel 234. The hydro pot 236 may hold the individual plant 912 such that the roots 914 of the individual plant 912 may pass through the hydro pot 236 to reach the water 900 in the individual growing barrel 234. As a non-limiting example, the hydro pot 236 may be a net pot. The hydro pot 236 may be removable from the individual growing barrel 234. In some embodiments, the hydro pot 236 may hold am inert substrate to support the one or more plants 910.

The water tank 240 may be a storage container for the water 900. In some embodiments, the water 900 from the water tank 240 may be circulated in a closed loop from the water tank 240, to the sprinkler subsystem, over the one or more plants 910, into the plurality of growing barrels 232, overflowing from the plurality of growing barrels 232 into the catch basin 216, and pumped from the catch basin 216 back to the water tank 240.

The air pump 256 may pump air into the plurality of growing barrels 232 such that the water 900 within the plurality of growing barrels 232 may be oxygenated. The air pump 256 may pump the air into the plurality of growing barrels 232 via air tubing.

The sprinkler subsystem may comprise one or more water distribution pipes 262 and one or more sprinkler heads 264. The water 900 may be pumped through the one or more water distribution pipes 262 to the one or more sprinkler heads 264 located above the plurality of growing barrels 232 where the water 900 may be dispersed onto the one or more plants 910. The one or more sprinkler heads 264 may be replaceable to change the nozzle type such that a mist, spray, or drip of the water 900 may be achieved.

In some embodiments, the water tank 240 may be positioned lower than the catch basin 216 such that the water 900 may flow from the sprinkler subsystems to the water tank 240 and may be pumped by the first water pump 250 back to the sprinkler subsystems. In some embodiment, the water tank 240 may be elevated to the same height as the catch basin 216 and a second water pump 252 may move the water 900 from the water tank 240 to the sprinkler subsystems while the first water pump 250 moves the water 900 from the catch basin 216 to the water tank 240.

Figure 1:
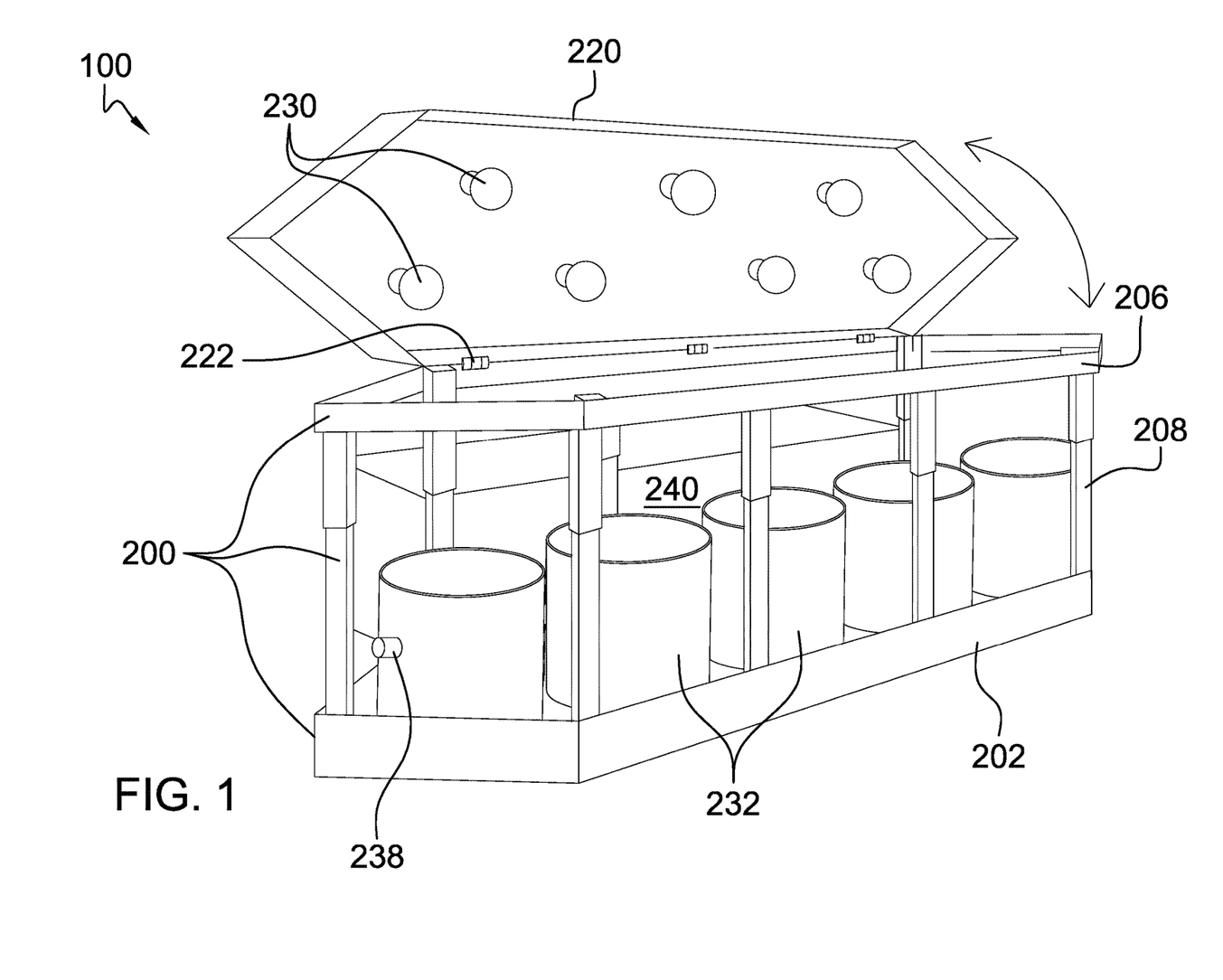
FIG. 1 is a front isometric view of an embodiment of the disclosure.
Figure 2:
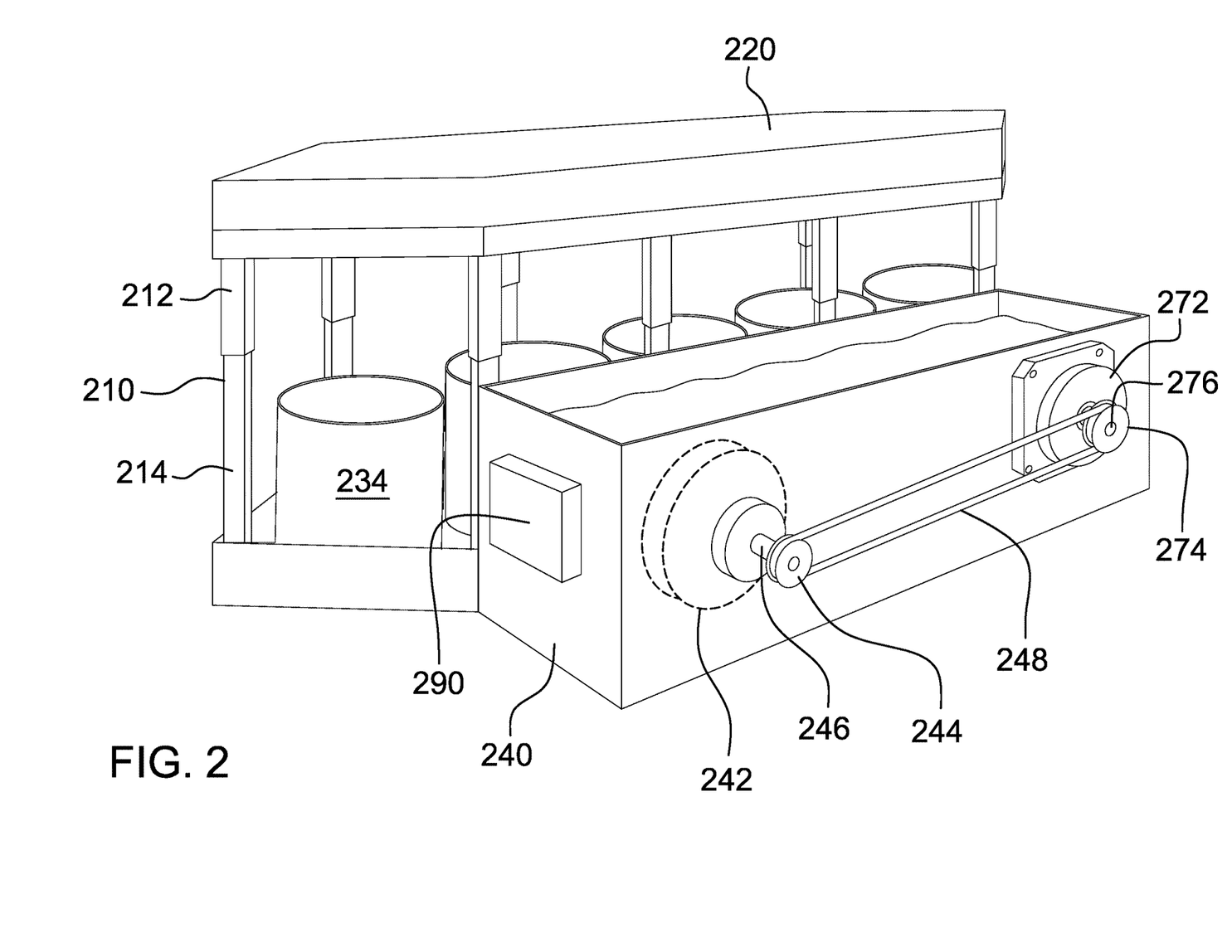
FIG. 2 is a rear isometric view of an embodiment of the disclosure.
Figure 3:
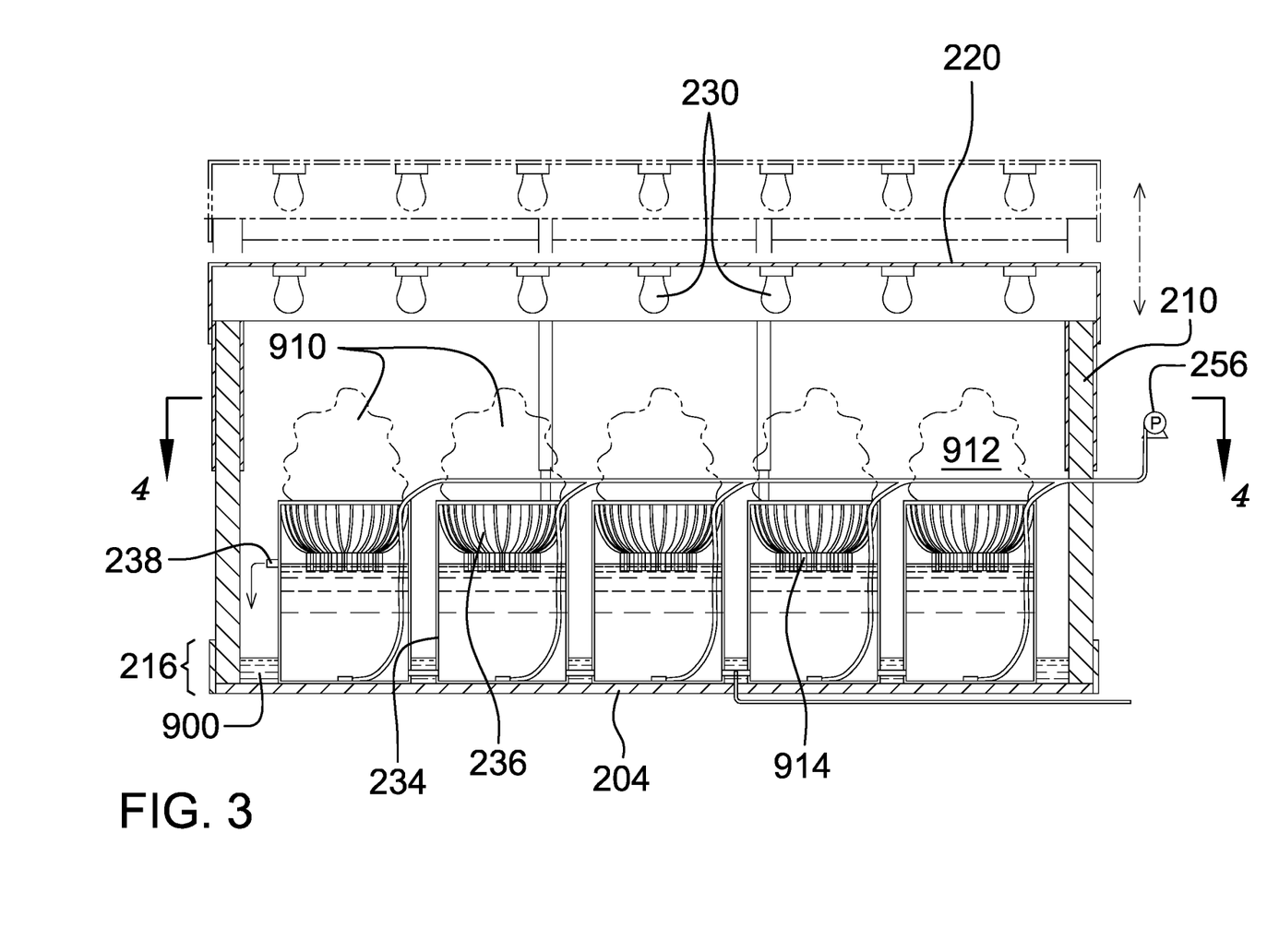
FIG. 3 is a vertical cross-sectional view of an embodiment of the disclosure along a longitudinal centerline.
Figure 4:
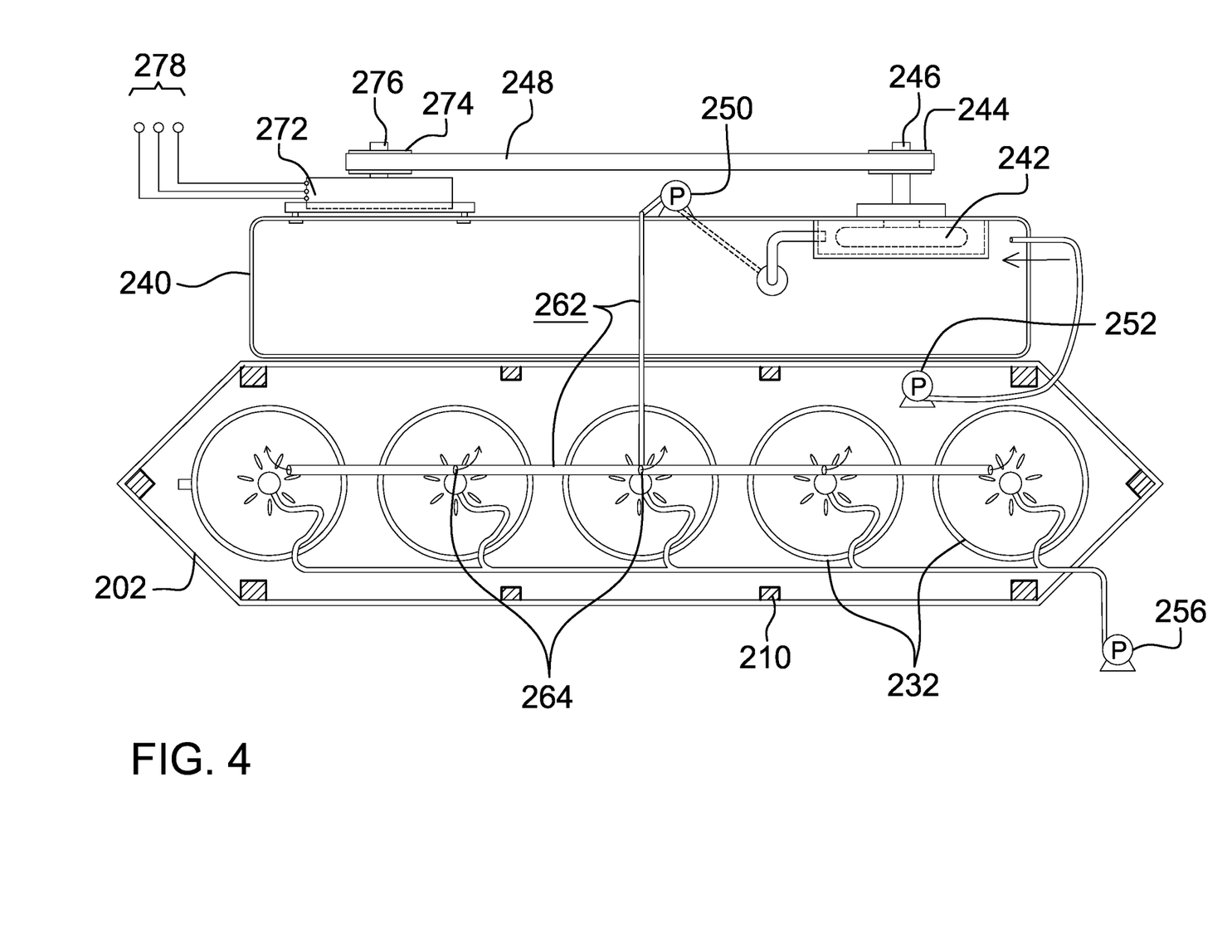
FIG. 4 is a cross-sectional view of an embodiment of the disclosure across 4-4 as shown in FIG. 3.
Figure 5:
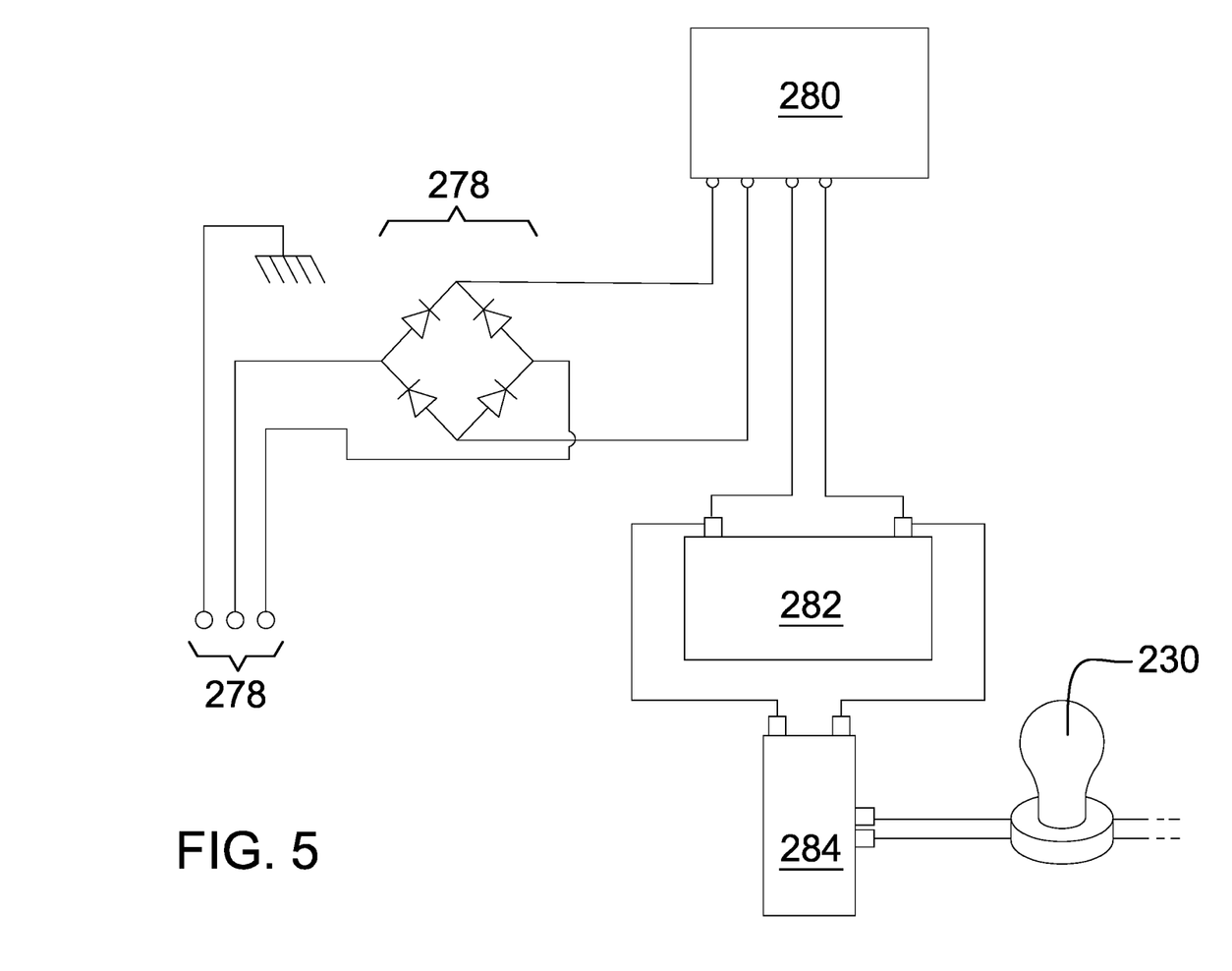
FIG. 5 is a schematic diagram of an embodiment of the disclosure illustrating a portion of the hydroelectric generating system.

The hydroelectric generating subsystem may comprise a Pelton wheel 242, a belt 248, a generator 272, a charge controller 280, a battery 282, a power inverter 284, and a rectifier circuit 286. The hydroelectric generating subsystem may produce an electrical output 278 from the movement of the water 900 within the invention 100. The electrical output 278 may be used to power the one or more grow lights 230, the air pump 256, the first water pump 250, the second water pump 252, or combinations thereof. The generator 272 may be turned indirectly by the Pelton wheel 242 and the generator 272 may produce the electrical output 278. The Pelton wheel 242 may turn as a result of the water 900 being streamed against the Pelton wheel 242. The Pelton wheel 242 may be coupled to a first end of a first shaft 246. The first shaft 246 may pass through the wall of the water tank 240.

A second end of the first shaft 246 may be coupled to a first pulley 244. The belt 248 may rotationally couple the first pulley 244 to a second pulley 274 such that rotation of the first pulley 244 causes rotation of the second pulley 274. The second pulley 274 may be coupled to a second shaft 276. The second shaft 276 may be the center shaft of the generator 272. Rotation of the second pulley 274 may turn the generator 272 and may produce the electrical output 278.

The electrical output 278 produced by the generator 272 may pass through the rectifier circuit 286 and then to the charge controller 280. As a non-limiting example, the rectifier circuit may be a full wave diode bridge. The charge controller 280 may monitor the charge state of the battery 282 and may determine when to charge the battery 282 from the electrical output 278. The battery 282 may be electrically coupled to the power inverter 284. The power inverter 284 may convert the DC output of the battery 282 into an AC voltage that may power a load. As non-limiting examples, the load may be the one or more grow lights 230, the air pump 256, the first water pump 250, the second water pump 252, or combinations thereof.

The battery 282 may comprise one or more energy-storage devices. The battery 282 may be a source of electrical energy to operate the system controller 290 and the power inverter 284. The battery 282 may be replaceable or rechargeable.

The system controller 290 may control the operation of the one or more grow lights 230, the air pump 256, the first water pump 250, the second water pump 252, or combinations thereof based at least in part upon a timer. As a non-limiting example, the system controller 290 may turn the one or more grow lights 230 on at certain times of the day and off at other times of the day to achieve a pre-programmed light profile.

For aeroponic growing, the top of the support frame 200 may be elevated using the plurality of vertical supports 208 and the hydro pots 236 may be suspended below the cover 220 such that the sprinkler subsystem mists the roots 914 of the one or more plants 910.

For ebb and flow growing, also known as flood and drain, the system controller 290 may periodically run the first water pump 250 and the second water pump 252 to drench the one or more plants 910 for intervals of 5 to 10 minutes to flood the one or more plants 910 and then cease watering to allow the water level to subside. The water 900 may contain dissolved nutrients.

For deep water culture growing, the one or more plants 910 in net pots may be continuously suspended in the plurality of growing barrels 232 where the roots 914 contact the water 900. The water 900 may be aerated by the air pump 256 and may contain nutrients.

In use, the one or more plants 910 may be placed in the hydro pots 236 and the hydro pots 236 may be placed on top of the plurality of growing barrels 232 or suspended from the cover 220 above the plurality of growing barrels 232. The water tank 240 may be filled with water and, in some cases, nutrients may be dissolved in the water 900. The system controller 290 may be activated to execute a programmed sequence of operating the one or more grow lights 230, the air pump 256, the first water pump 250, the second water pump 252, or combinations thereof that is appropriate for the type of growing being performed. As a non-limiting example, for aeroponic growing the system controller 290 may provide 12 hours of continuous light followed by 12 hours of continuous darkness with the one or more plants 910 being continuously watered by misting. As the water 900 is pumped, the Pelton wheel 242 may turn the generator 272 and produce the electrical output 278 to charge the battery 282. The charge in the battery 282 may be applied to the power inverter 284 to produce an AC voltage for running the one or more grow lights 230 or the pumps.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "AC" may be an acronym for alternating current.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words "couple", "couples", "coupled" or "coupling", may refer to connecting, either directly or indirectly, and does not necessarily imply a mechanical connection.

As used in this disclosure, "DC" may be an acronym for direct current.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "diode" may be a two terminal semiconductor device that allows current flow in only one direction. The two terminals are called the anode and the cathode. Electric current is allowed to pass from the anode to the cathode.

As used here, "footprint" may refer to a vertical, downward projection of an object onto the surface that supports the object. The portion of the supporting surface that is within the footprint is, by definition, underneath the object.

As used herein, "front" may indicate the side of an object that is closest to a forward direction of travel under normal use of the object or the side or part of an object that normally presents itself to view or that is normally used first. "Rear" or "back" may refer to the side that is opposite the front.

In this disclosure, a "generator" converts rotational mechanical energy into electric energy.

As used herein, "grow light" may refer to a source of illumination that attempts to provide a light spectrum similar to that of the sun or to provide a spectrum that is more tailored to the needs of the plants being cultivated.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object.

Specifically, the inside diameter is the distance from one inside wall to the opposite inside wall. If the object is round, then the inside diameter is a true diameter, however the term may also be used in connection with a square object in which case the inside diameter is simply the narrowest inside measurement that passes through the center of the object.

As used in this disclosure, the term "load" may refer to an object upon which a force is acting or which is otherwise absorbing energy in some fashion. As non-limiting examples, a mass that is being moved a distance or an electrical circuit element that draws energy. The term load may also be used to refer to a force that is applied to a stationary structure.

As used herein, "net" may refer to an open-mesh structure that is twisted, knotted, or woven together at regular intervals. A net may be used as a barrier that blocks the passage of large items while allowing small items and fluids to pass through.

As used herein, "net pot" may refer to a webbed plastic growing container comprising apertures in the bottom of the pot. The apertures may allow nutrients to enter the pot to reach the roots of the plants. The apertures may also allow water to drain out of the pot.

As used herein, "outside diameter" or "outer diameter" may refer to a measurement made on an object. Specifically, the outside diameter is the distance from one point on the outside of the object to a point on the opposite side of the object along a line passing through the center of the object. The term outside diameter is frequently used in conjunction with round objects such as hollow conduits in which case the outside diameter is a true diameter, however the term may also be used in connection with a square object in which case the outside diameter is simply the widest outside measurement that passes through the center of the conduit.

As used herein, "Pelton wheel" may refer to an impulse type water turbine that extracts energy from the impulse of moving water, as opposed to water's dead weight like the traditional overshot water wheel.

As used in this disclosure a "pulley" may be a wheel with a grooved rim around which a cord (or other form of rope, line, belt, or cable) passes. The pulley may be used to change the direction of a force applied to the cord. In some embodiments, pulleys may be used in groups of two or more to convey a force from one pulley to all other pulleys in the group via a belt.

As used in this disclosure, a "pump" may be a mechanical or electromechanical device that uses suction or pressure to raise or move fluids, compress fluids, or force a fluid into an inflatable object. As non-limiting examples, fluids may include both liquids, such as water, and gases, such as air.

As used herein, "rectifier" may refer to an electrical circuit that takes an AC Voltage input and converts it to a pulsing DC voltage output.

As used in this disclosure, the term "shaft" may be used to describe a rigid cylinder. A shaft is often used as the handle of a tool or implement or as the center of rotating machinery or motors. The definition of shaft explicitly includes solid shafts or shafts that comprise a hollow passage through the shaft along the center axis of the shaft cylinder, whether the shaft has one or more sealed ends or not.

As used in this disclosure, a "spray" may be a plurality of liquid drops projected from a nozzle.

As used in this disclosure, "telescopic", "telescoping", and "telescopically" refer to an object made of sections that fit or slide into each other such that the object can be made longer or shorter by adjusting the relative positions of the sections.

As used in this disclosure, a "tube" or "tubing" may refer to a hollow cylindrical device that is used for transporting liquids and/or gases. In this disclosure, the terms inner diameter and outer diameter are used as they would be used by those skilled in the plumbing arts. The line that connects the center of the first base of the cylinder to the center of the second base of the cylinder and is equidistant from the outer surface of the tube for its entire length is referred to as the centerline of the tube. When two tubes share the same centerline, they are said to be aligned. When the centerlines of two tubes are perpendicular to each other, the tubes are said to be perpendicular to each other. As used here, "tubing" may refer to a tube that is flexible or resilient.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A hydroponic growing system comprising: a support frame, a cover, one or more grow lights, a plurality of growing barrels, a water tank, a first water pump, an air pump, a sprinkler subsystem, a hydroelectric generating subsystem, and a system controller;
   wherein the hydroponic growing system is a growing system for growing one or more plants;
   wherein the one or more plants are grown within the plurality of growing barrels supported within the support frame;
   wherein the one or more grow lights suspended from the cover of the support frame provide illumination that is necessary for photosynthesis;
   wherein water is stored in the water tank and is pumped to the one or more plants by the first water pump;
   wherein the hydroelectric generating subsystem generates electricity as the water moves through the hydroponic growing system;
   wherein the hydroelectric generating subsystem comprises a Pelton wheel, a belt, a generator, a charge controller, a battery, a power inverter, and a rectifier circuit;
   wherein the hydroelectric generating subsystem produces an electrical output from the movement of the water within the hydroponic growing system;
   wherein the electrical output is used to power the one or more grow lights, the air pump, the first water pump, the second water pump, or combinations thereof;

wherein the generator is turned indirectly by the Pelton wheel and the generator produces the electrical output.

2. The hydroponic growing system according to claim 1
wherein the air pump oxygenates the water;
wherein the support frame comprises a plurality of bottom horizontal frame members, a bottom panel, a plurality of top horizontal frame members, and a plurality of vertical supports;
wherein the support frame retains the plurality of growing barrels under the one or more grow lights and collects the water running off of the one or more plants.

3. The hydroponic growing system according to claim 2
wherein the footprint of the support frame is an elongated hexagon.

4. The hydroponic growing system according to claim 2
wherein the plurality of bottom horizontal frame members are vertically-oriented walls surrounding the support frame at the bottom of the plurality of vertical supports;
wherein the height of the plurality of bottom horizontal frame members are less than the height of the plurality of growing barrels;
wherein the bottom panel covers the bottom of the support frame;
wherein the edges of the bottom panel are coupled to the bottom edge of the plurality of bottom horizontal frame members such that the bottom panel and the plurality of bottom horizontal frame members form a catch basin operable to retain the water falling from above;
wherein the plurality of top horizontal frame members are vertically-oriented walls surrounding the support frame at the top of the plurality of vertical supports;
wherein the plurality of top horizontal frame members retain the shape of the support frame as the plurality of vertical supports are expanded and retracted.

5. The hydroponic growing system according to claim 4
wherein the plurality of vertical supports are telescoping support members dispersed around the periphery of the hydroponic growing system;
wherein an individual vertical support expands and contracts such that the height of the support frame is adjusted;
wherein the individual vertical support comprises a top support section and a bottom support section;
wherein the top support section is a vertically-oriented hollow armature;
wherein the top of the top support section is coupled to the inside surface of the plurality of top horizontal frame members;
wherein the bottom support section is a vertically-oriented armature;
wherein the bottom of the bottom support section is coupled to the inside surface of the plurality of bottom horizontal frame members;
wherein the outside diameter of the bottom support section is smaller than the inside diameter of the top support section such that the bottom support section slides into the top support section.

6. The hydroponic growing system according to claim 5
wherein the cover caps the top of the support frame;
wherein the cover is hingedly coupled to the support frame via one or more hinges.

7. The hydroponic growing system according to claim 6
wherein the one or more grow lights are coupled to the underside of the cover such that the one or more grow lights illuminate the one or more plants located within the support frame.

8. The hydroponic growing system according to claim 7
wherein the plurality of growing barrels are open-top canisters;
wherein an individual growing barrel selected from the plurality of growing barrels retains the water for roots of an individual plant;
wherein the individual growing barrel comprises an overflow outlet such that the water level within the individual growing barrel does not rise above the overflow outlet.

9. The hydroponic growing system according to claim 8
wherein the individual growing barrel retains a hydro pot at the top of the individual growing barrel;
wherein the hydro pot holds the individual plant such that the roots of the individual plant pass through the hydro pot to reach the water in the individual growing barrel;
wherein the hydro pot is removable from the individual growing barrel.

10. The hydroponic growing system according to claim 9
wherein the water tank is a storage container for the water.

11. The hydroponic growing system according to claim 10
wherein the air pump pumps air into the plurality of growing barrels such that the water within the plurality of growing barrels is oxygenated.

12. The hydroponic growing system according to claim 11
wherein the sprinkler subsystem comprises one or more water distribution pipes and one or more sprinkler heads;
wherein the water is pumped through the one or more water distribution pipes to the one or more sprinkler heads located above the plurality of growing barrels where the water is dispersed onto the one or more plants.

13. The hydroponic growing system according to claim 12
wherein the water tank is positioned lower than the catch basin such that the water flows from the sprinkler subsystems to the water tank and is pumped by the first water pump back to the sprinkler subsystems.

14. The hydroponic growing system according to claim 12
wherein the water tank is elevated to the same height as the catch basin and a second water pump moves the water from the water tank to the sprinkler subsystems while the first water pump moves the water from the catch basin to the water tank.

15. The hydroponic growing system according to claim 1
wherein the Pelton wheel turns as a result of the water being streamed against the Pelton wheel;
wherein the Pelton wheel is coupled to a first end of a first shaft;
wherein the first shaft passes through the wall of the water tank;
wherein a second end of the first shaft is coupled to a first pulley;
wherein the belt rotationally couples the first pulley to a second pulley such that rotation of the first pulley causes rotation of the second pulley;
wherein the second pulley is coupled to a second shaft;
wherein the second shaft is the center shaft of the generator;
wherein rotation of the second pulley turns the generator and produces the electrical output.

16. The hydroponic growing system according to claim 15
wherein the electrical output produced by the generator passes through the rectifier circuit and then to the charge controller;
wherein the charge controller monitors the charge state of the battery and determines when to charge the battery from the electrical output;

wherein the battery is electrically coupled to the power inverter;

wherein the power inverter converts the DC output of the battery into an AC voltage that powers a load.

17. The hydroponic growing system according to claim 16 wherein the battery comprises one or more energy-storage devices;

wherein the battery is a source of electrical energy to operate the system controller and the power inverter;

wherein the battery is replaceable or rechargeable.

18. The hydroponic growing system according to claim 17 wherein the system controller controls the operation of the one or more grow lights, the air pump, the first water pump, the second water pump, or combinations thereof based upon a timer.

* * * * *